Sept. 19, 1933.  S. S. MATTHES  1,927,214
CONNECTING DEVICE FOR TROLLEY WIRE SUPPORTS
Filed April 29, 1932
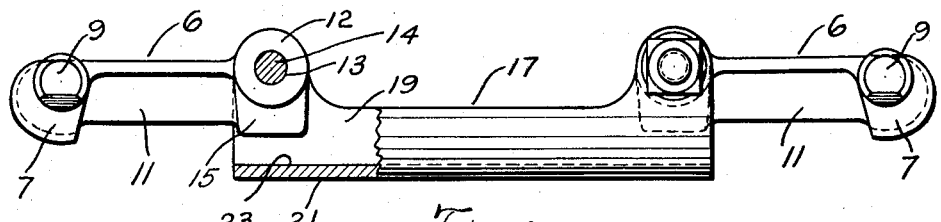
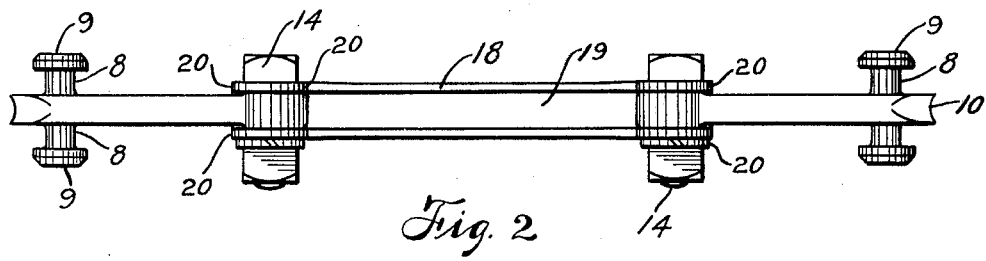
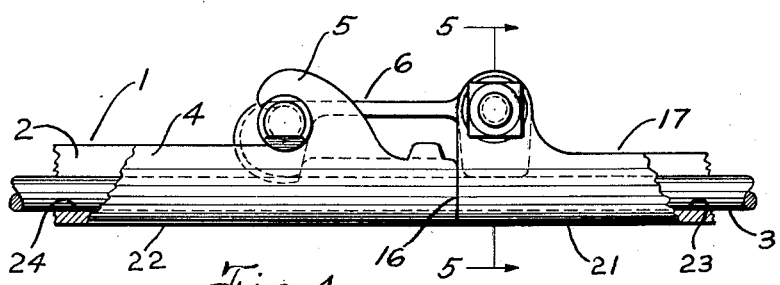
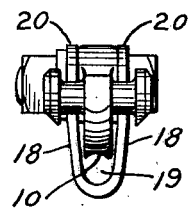
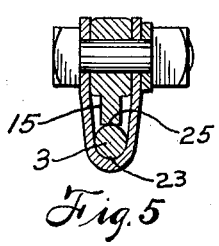
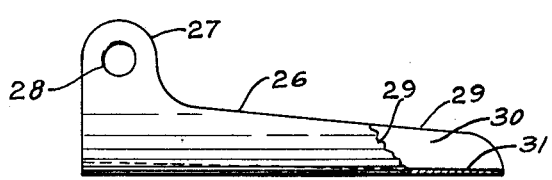
Inventor
SAMUEL S. MATTHES
By
Attorney Patented Sept. 19, 1933

1,927,214

UNITED STATES PATENT OFFICE 1,927,214

CONNECTING DEVICE FOR TROLLEY WIRE SUPPORTS

Samuel S. Matthes, Mansfield, Ohio, assignor to The Ohio Brass Company, Mansfield, Ohio, a corporation of New Jersey Application April 29, 1932. Serial No. 608,262

16 Claims. (Cl. 191—38)

My invention relates to devices used in connection with overhead trolley construction and particularly for connecting certain devices together where necessary thus avoiding the necessity of building entirely new devices of a complicated character.

In the construction of an overhead trolley system it is often desirable to have a plurality of trolley wires crossing each other as, for instance, two wires crossing another trolley wire or crossing two other trolley wires and in such cases it is necessary to construct crossing devices to meet the necessary requirements and such devices may be of a special character in many cases due to the spacing of the trolley wire varying and this makes an expensive construction.

If the present standard devices arranged to take a single wire crossing a single wire could be combined with another like device or two other like devices, depending upon the requirements, it will be quite apparent that such an arrangement would be simple, economical and quite flexible and with this in view I have devised ways and means of accomplishing such a result which comprises combining with two or more standard crossings connecting means, the length of which can be made different to meet requirements at a very little expense.

My invention may be carried out in connection with trolley wire crossing devices of either the live or insulated types or it may be used in connecting overhead trolley switches to section insulators or to connect section insulators together, etc.

I have not shown in the drawing the various devices mentioned above as they are well known to those skilled in the art. However, a switch of the type referred to is shown in Patent 1,682,-136, the section insulator is illustrated in Patent 1,773,192 and a trolley wire crossing of the insulated type is shown in Patent 1,105,662.

For simplicity I have shown the end of one of the devices to be connected.

My invention resides in the new and novel construction, combination and relation of the various parts hereinafter described and showed in the accompanying drawing.

In the drawing:—

Fig. 1 is a side view in partial section of my connecting device for joining together two of the devices referred to above.

Fig. 2 is a top view of Fig. 1.

Fig. 3 is an end view of Fig. 1.

Fig. 4 shows one end of the connecting device shown in Fig. 1 attached to an end of a section insulator, trolley wire crossing, trolley wire frog, etc. and the other end of the connecting device would be attached to a similar end on one of the referred to devices.

Fig. 5 is a sectional view on the line 5—5 of Fig. 4.

Fig. 6 is a modification of one part of my invention.

My invention comprises two overhead trolley devices provided with body castings 1 spaced apart the required distance, each body would be provided with a groove 2 to receive the trolley wire 3. The side walls 4 forming the groove 2 would be provided with oppositely disposed undercut lugs 5.

Removably and pivotally mounted upon each body member 1 is a clamp 6 having a cam clamping portion 7 and laterally projecting pivot studs 8 provided with end heads 9. The studs 8 are eccentrically positioned relative to the clamping face 10 of the clamping cam 7.

The cam portion 7 is provided with an extension member 11 integrally united thereto and provided with an enlarged end portion 12 provided with a transverse opening 13 to receive a thru-bolt or rivet 14. The enlarged portion 12 is provided with a projection 15 arranged to directly engage with or rest in close proximity to the trolley wire 3.

Interposed between ends 16 of the body members 4 and interposed between the clamps 6 is a connecting member 17 having a wall 18 forming a U-shaped channel 19 and upstanding space lugs 20. The lugs 20 are each provided with transverse openings to receive the thru-bolt or rivet 14.

The lower surface 21 of the connecting member 17 and the lower surface 22 of the body member 4 are flush so as to offer a smooth passage for a current collector across the device and likewise the lower surface 23 of the groove 19 is flush or aligned with the surface 24 of the body member 4 so as to offer continuous surface upon which the trolley wire 3 may repose.

When assembled the face 25 of the portion 15 will be spaced from the surface 23 a distance sufficient to easily accommodate the trolley wire 3 of a given size so as to maintain the trolley wire in engagement with the surface 23 or substantially so.

When assembling the various parts, the devices 1, whether crossings or section insulators, etc., would be placed in position with respect to the trolley wires and held approximately in their relative position to each other. The clamps 6 would then be positioned by interlocking the pivot studs 8 with the undercut lugs 5 with the extension member 11 extending in an upwardly direction. The extension member 11 would then be forced downwardly into the position shown in Fig. 4 thus causing the cam clamp 7 to engage the trolley wire 3 and force it down against its seat 24 in the member 4. This then locks the body member 4 in position relative to the trolley wire. This operation is carried out in connection with the clamping member 6 on both devices to be connected.

The connecting member 17 is then placed in position and the bolts or rivets 14 inserted thus locking and holding the member 17 to the clamps 6.

In Fig. 6 I have shown a modification of the member 17 in that it comprises a U-shaped member 26 provided with oppositely disposed lugs 27 corresponding to lugs 20 on the part 17 and transversely disposed openings 28 in the lugs 27 to receive a thru-bolt or rivet 14. The oppositely disposed walls 29 form the U-shaped groove 30 corresponding to the groove 19 in the member 17 to receive the trolley wire 3. The connecting portion of the walls 29, or bight 31, is tapered such that at its free end it is substantially a knife edge while at its opposite end which will be adjacent the member 4 it will have the thickness of the corresponding adjacent portion on the member 4.

This member 26 shown in Fig. 6 may be used in connection with the body member 4 on crossings, section insulators, etc. in place of the member 17 when it is not desired to connect two bodies together and while the member 17 will usually be made of iron the member 26 would preferably be made of brass or bronze and when installed in combination with the body member 4 the upper or free edge of the walls 29 would be peened over in contact with the trolley wire so as to interlock therewith and hold the trolley wire and member 26 against relative movement about the axis of the bolt 14.

While I have shown the members 17 and 26 provided with an open top U-shaped groove or channel it will be quite apparent that the groove may be inverted, that is, an open bottom groove and in that case the free edge of the lips or walls would be bent inwardly and if sufficiently long would overlap the trolley wire and practically enclose the same along its lower edge thus being the equivalent of the bight portion of the parts 17 and 26 and would thus be interlocked with the trolley wire and prevent the rotation of the clamp to its unclamping position.

It will be apparent that my arrangement permits of connecting two or more standard devices together and the separation can be made anything desirable by merely changing the length of the one member 17 which is a very simple and inexpensive proposition as compared with making up a single device specifically for the purpose and with the separation required.

Modifications will suggest themselves to those skilled in the art, therefore, I wish to be limited only by my claims.

I claim:—

1. In a device of the class described, the combination with a pair of spaced body members to receive a trolley wire, of a rotary clamp mounted on each said body and each clamp having means rotatable into position with respect to its body member, the clamps each having spaced means to engage with the trolley wire and means at one end whereby attachments may be made to the clamp and a connecting member interposed between the body members and secured to the clamps and having means to receive the trolley wire and protect it from wear and hold the body members in spaced relation.

2. In a device of the class described, the combination of a pair of spaced body members each having a channel for a trolley wire and spaced undercut lugs, a rotary clamp mounted on each member and removably pivoted in said lugs to clamp the trolley wire in its channel and having an extension adapted to engage the trolley wire, a connecting member interposed between the ends of the body member and having a channel to receive the trolley wire and means to connect the connecting member to the said extensions to hold the body members against separation.

3. In a device of the class described, the combination of a pair of spaced body members each having a channel for a trolley wire and undercut lugs, a rotary clamp mounted on each member and removably pivoted in said lugs to clamp the trolley wire in its channel and having an extension member, a connecting member interposed between the ends of the body member and having a channel to receive the trolley wire, means to connect the connecting member to the said extension members to prevent separation of the body members and means on the extension member to maintain the wire in juxtaposed relation to the surface of the channel in the connecting member.

4. The combination of a pair of spaced trolley wire crossings each provided with a body member having a channel for the trolley wire open at its top and with upstanding spaced lugs on the body disposed on each side of said channel and having undercut slots, a renewable clamp having a clamping member rotatably pivoted in said slots on each body and having projecting means and a connecting member secured to the free ends of the projecting means to secure and hold the body members together and the renewable clamps in a predetermined spaced relation.

5. In a device of the class described, the combination of a pair of spaced body members each having an open top channel into which a trolley wire may be placed, cam clamps removably pivoted on the body members to engage the upper surface of the trolley wire and press its lower surface into engagement with the bight of the channel in each body member, a connecting member removably secured to the cam clamps to maintain the body members in spaced relation, the connecting member having an open top channel to receive the trolley wire and extend along the lower face of the wire and means on the clamps extending along the upper surface of the trolley wire opposite that extending along the connecting member.

6. In a device of the class described, the combination of a pair of spaced body members each having an open top channel into which a trolley wire may be placed, cam clamps removably pivoted on the body members to engage the upper surface of the trolley wire and press the trolley wire into engagement with the bight of the channel in each body member, a connecting member interposed between the body members and having an open top channel extending from end to end to receive the trolley wire and arranged to engage the lower surface of the trolley wire and means to secure the clamps to the connecting member to prevent the clamps rotating and to hold them in clamping relation to the trolley wire.

7. In a device of the class described, the combination of a pair of spaced body members each having an open top channel for a trolley wire, upstanding lugs on the body members disposed on each side of the channels and having undercut slots, cam clamping members having laterally extending pivot lugs removably mounted in said slots and each having an extension and means removably secured to the free ends of the extensions to prevent separation of the body members.

8. In a device of the class described, the combination of a body member having an open top channel for a trolley wire, upstanding lugs on the body member disposed on each side of the channel and having undercut slots therein, a cam clamping member having laterally extending pivot lugs removably mounted in said slots and having an extension and means removably secured to the free end of the extension adjacent the body and having an open top groove to receive and extend along the trolley wire beyond the end of the body member and engage the trolley wire along its lower surface.

9. In a device of the class described, the combination of a body member having an open top channel for a trolley wire, upstanding lugs on the body member disposed on each side of the channel and having undercut slots therein, a cam clamping member having laterally extending pivot lugs removably mounted in said slots and having an extension and means removably secured to the free end of the extension adjacent the body and having walls forming an open top groove to receive and extend along the trolley wire beyond the end of the body member and engage the trolley wire along its lower surface, the bight of the walls being tapered from a maximum at the end adjacent the body to substantially a knife edge of its opposite end.

10. In a device of the class described, the combination of a body member having an open top channel for a trolley wire, upstanding lugs on the body member disposed on each side of the channel and having undercut slots therein, a cam clamping member having laterally extending pivot lugs removably mounted in said slots and having an extension and means removably secured to the free end of the extension adjacent the body and having walls forming an open top groove to receive and extend along the trolley wire beyond the end of the body member and engage the trolley wire along its lower surface, the bight of the walls being tapered from a maximum at the end adjacent the body to substantially a knife edge at its opposite end and the side walls of the groove arranged to be folded inwardly over the trolley wire from the free end of the said means to engage the trolley wire and lock the said free end thereto.

11. In a device of the class described, the combination of a body member having an open top channel for a trolley wire, upstanding lugs on the body member disposed on each side of the channel and having undercut slots therein, a cam clamping member having laterally extending pivot lugs removably mounted in said slots and having an extension and means removably secured to the free end of the extension adjacent the body and having walls forming a groove to receive and extend along the trolley wire from a point adjacent the end of the body member, the free edges of the walls being bendable into engagement with the trolley wire.

12. A connecting device comprising in combination a pair of spaced clamping members connected by a connecting member, each clamp having a cam clamping portion with means to removably secure it to a support in pivotal relation thereto and an integrally formed extension, the connecting member having an open top channel to receive a trolley wire and means to removably secure the connecting member to the extensions on the clamps.

13. A connecting device comprising in combination a pair of spaced clamping members connected by a connecting member, each clamp having a cam clamping portion with means to removably secure it to a support in pivotal relation thereto and an integrally formed extension having a transverse opening through the free end, the connecting member having an open top channel to receive a trolley wire and upright spaced lugs with transverse openings therethrough and means extending through the openings to removably secure the connecting member to the extensions on the clamps.

14. A clamp for a trolley wire device comprising a cam portion having a surface to engage the trolley wire, laterally and oppositely disposed projecting pivot-stubs from the cam portion eccentrically positioned relative to the said cam engaging surface, an extension integrally formed with the cam portion and having one end free, a detachable member having a wire-receiving groove and means at the free end of the extension by means of which the detachable member is secured to the extension.

15. A clamp for a trolley wire device comprising a cam-portion having a surface to engage the trolley wire, laterally projecting means from the cam-portion and eccentrically positioned relative to the said cam engaging surface upon which the clamp pivots, an extension projecting from the cam-portion and having a free end, means removably secured to the free end of the extension and having walls forming a groove to receive the trolley wire, the free edges of the walls being bendable into locking relation with the trolley wire and means to secure the second said means to the extension.

16. A connecting device for trolley wire supports comprising in combination a pair of spaced clamping members connected by a detachable connecting member, each clamp having a cam clamping portion with means to detachably secure it to its support in pivotal relation thereto, the cam portion having a wire engaging surface eccentrically disposed to the said securing means and an extension to which the connecting member is detachably secured.

SAMUEL S. MATTHES.